N. W. NAPIER.
DISTRIBUTING TRUCK.
APPLICATION FILED MAY 19, 1917.
1,405,316
Patented Jan. 31, 1922.
4 SHEETS—SHEET 3.
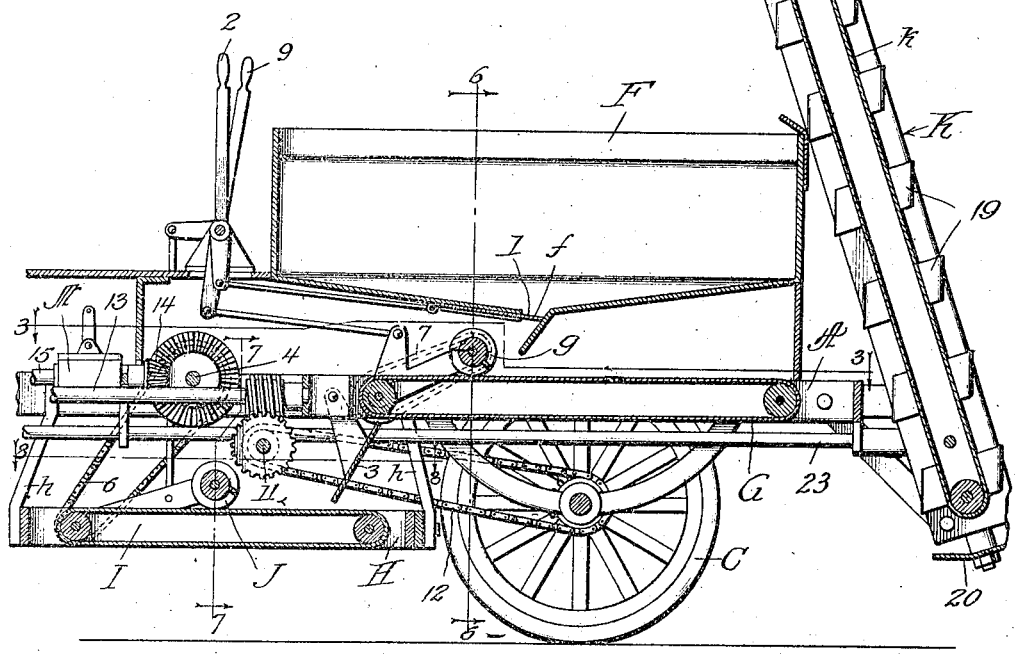
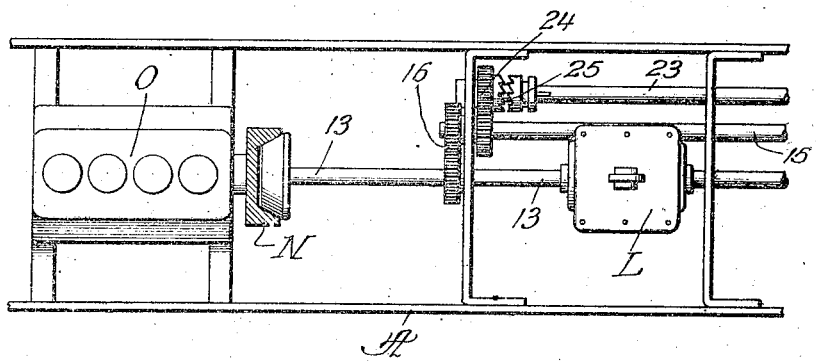

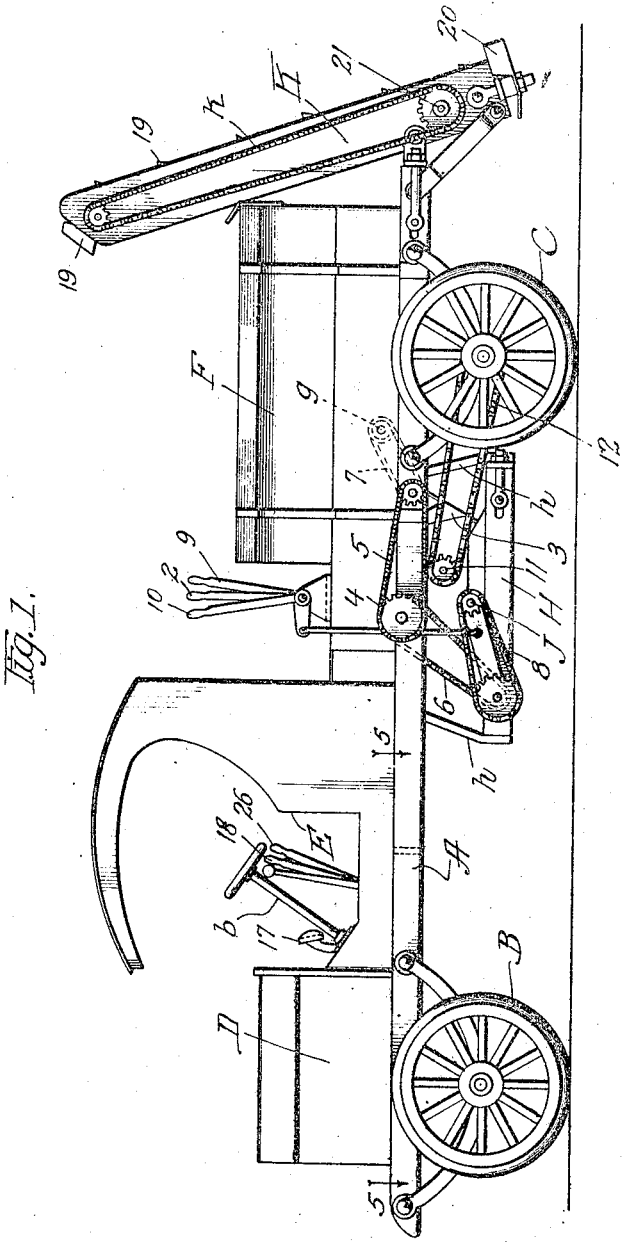

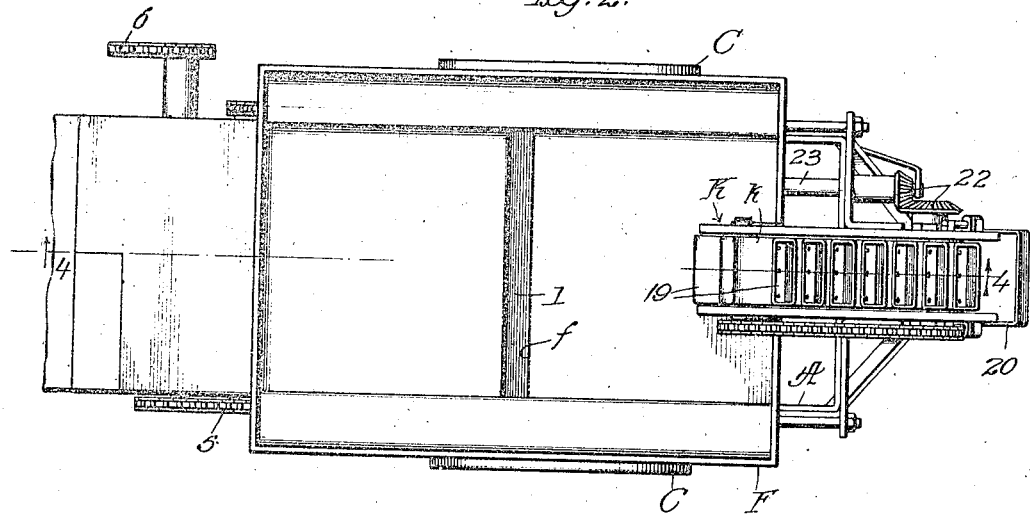
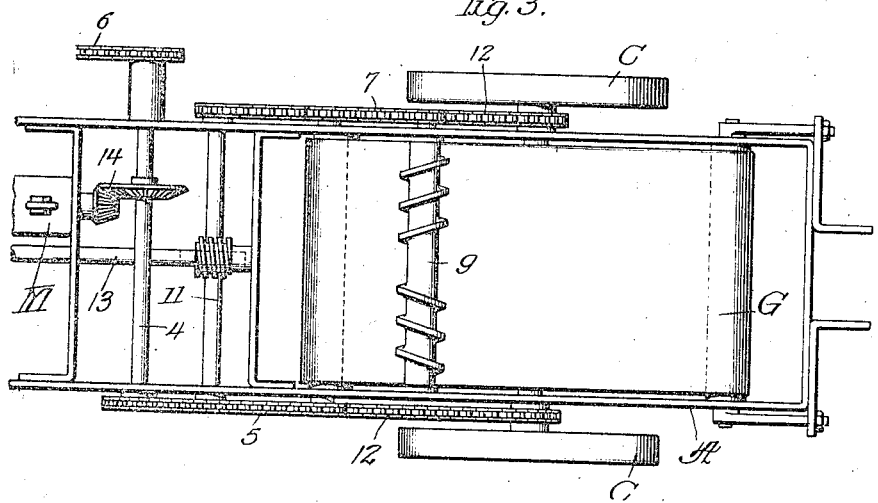

N. W. NAPIER.
DISTRIBUTING TRUCK.
APPLICATION FILED MAY 19, 1917.
1,405,316. Patented Jan. 31, 1922.
4 SHEETS—SHEET 4.
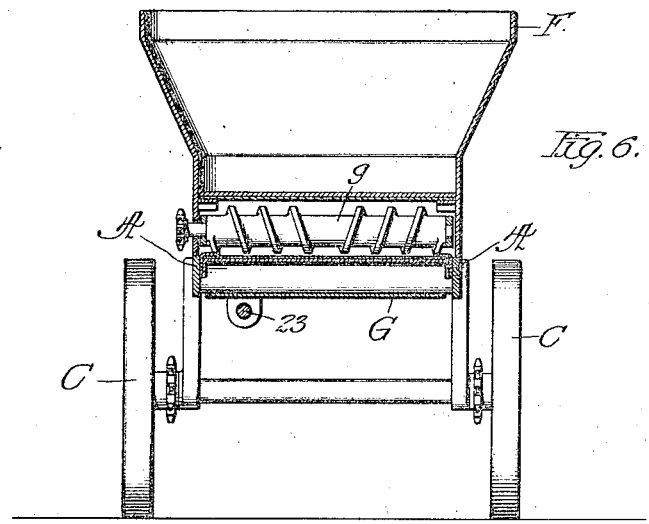
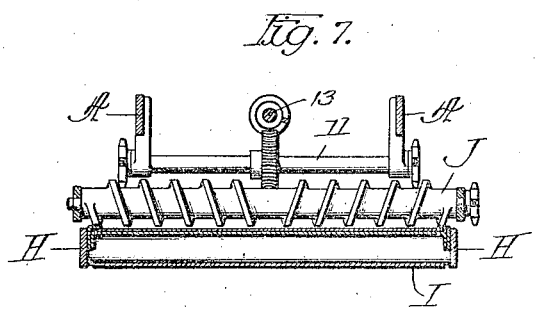
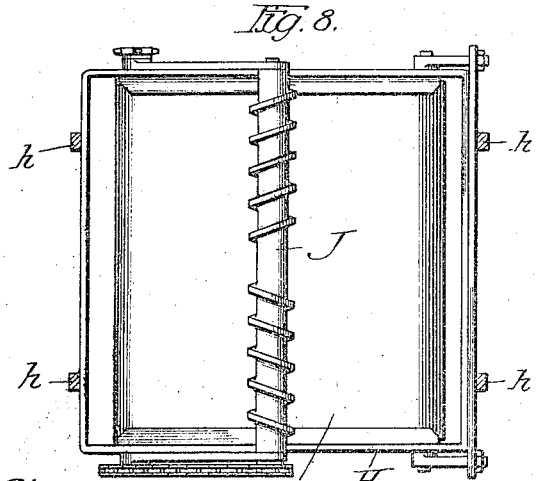

UNITED STATES PATENT OFFICE.

NELSON W. NAPIER, OF BENTON HARBOR, MICHIGAN, ASSIGNOR OF ONE-HALF TO FRANK L. NAPIER, OF ST. JOSEPH, MICHIGAN.

DISTRIBUTING TRUCK.

1,405,316.	Specification of Letters Patent.	Patented Jan. 31, 1922.

Application filed May 19, 1917. Serial No. 169,652.

*To all whom it may concern:*

Be it known that I, NELSON W. NAPIER, a citizen of the United States of America, and resident of Benton Harbor, Berrien County, Michigan, have invented a certain new and useful Improvement in Distributing Trucks, of which the following is a specification.

My invention relates to distributing trucks for carrying and discharging materials, such as gravel, crushed rock or sand, or any other similar or desired materials.

Generally stated, the object of my invention is to provide a distributing truck which will not only carry and discharge the materials from the bottom of the hopper thereof, but which will also spread the materials on the ground in the form of a flat sheet of the desired width and thickness, whereby, for example, in the building of a road, the crushed rock or other materials can be spread thereon in the desired manner, thus obviating the necessity of spreading the materials by hand, and thereby reducing the cost of making roads.

It is also an object to provide certain details and features of construction and combinations tending to increase the general efficiency and desirability of a distributing truck having a spreading apparatus of this particular character.

To these and other useful ends, my invention consists in matters hereinafter set forth and claimed.

In the accompanying drawings:—

Fig. 1 is a side elevation of a distributing truck for spreading the materials on the ground, embodying the principles of my invention.

Fig. 2 is an enlarged plan of the rear portion of said distributing truck.

Fig. 3 is a view similar to Fig. 2, but showing the hopper and its loading attachment removed.

Fig. 4 is a longitudinal section on line 4—4 in Fig. 2.

Fig. 5 is a detail plan view of the power-transmitting connections.

Fig. 6 is a transverse section on line 6—6 in Fig. 4.

Fig. 7 is a transverse section on line 7—7 in Fig. 4.

Fig. 8 is a horizontal section on line 8—8 in Fig. 4.

As thus illustrated, my invention comprises a horizontal body-frame A, mounted on front and rear wheels B and C, in any suitable or desired manner, whereby the vehicle is in the general form of an automobile-truck. The engine is mounted under the hood D, in the usual manner, and the front wheels are provided with steering gear controlled by the steering column *b* arranged in front of the seat E in the usual and well-known manner. Upon the rear portion of the body-frame, and preferably over the rear axle, a hopper F is suitably supported to carry the load. This hopper is provided with a bottom having a transverse slot *f* which is controlled by a valve 1 of any suitable character, connected with a hand-lever 2 in any suitable or desired manner, so that the discharge from the hopper can be controlled or regulated at will. A horizontally disposed belt G is suitably mounted below said hopper, between the sides of the body-frame A, and therefore between the rear wheels C, to receive the materials from the hopper. A rotary spiral feed-device *g* is disposed transversely of the belt G, this device having right and left threads (see Fig. 6,) to spread the materials laterally on the belt, so that the materials will be spread on the belt in the form of a flat sheet of the desired width and thickness. A supplemental frame H is supported by hangers *h* on the main frame, in front of the rear wheels C, and a horizontally disposed traveling belt I is suitably mounted on this supplemental frame. These belts travel in the direction indicated by the arrows, so that their upper surfaces travel toward the front of the truck, and a slide or apron 3 is provided for delivering the materials from the belt G to the belt I, in a manner that will be readily understood. A rotary spiral feed-device J is disposed transversely of the belt I, and formed with right and left screw-threads to spread the materials outward on the belt I, whereby the sheet of material is primarily formed on the belt G and then enlarged or increased in width on the belt I, thereby to reduce the sheet of materials to the desired width and thickness before discharging it onto the ground. The body-frame is provided with a transverse shaft 4, and this shaft is connected by a sprocket-chain 5 with one end of the front roller of the belt G, so that the latter is driven at the desired speed. The front roller of the belt I is connected by a sprocket-chain 6 with the shaft 4, so that this belt is also driven at the desired speed. A sprocket-chain 7 connects the front roller of the belt G with one end of the rotary device $g$, so that the latter is also driven at the desired speed. A sprocket 8 connects one end of the front roller of the belt I with one end of the rotary device J, so that the latter is rotated at the desired speed. The device $g$ is mounted to swing up and down, so that it can be raised and lowered to give the materials the desired thickness on the belt G, and for this purpose said device is suitably connected with a hand-lever 9 by which it can be controlled. The device J is also movable up and down and is connected for this purpose with a hand-lever 10, and with this arrangement the thickness of the sheet of materials can be changed on either belt at will, and before the final delivery of the sheet of materials to the ground. The jack-shaft 11 is connected by sprocket-chains 12 with the rear driving wheels C of the truck, and this shaft is connected through gearing and the usual driving shaft 13 with the engine at the front of the machine, this connection having a clutch, in the usual manner, to control the transmission of power from the engine to the traction-wheels. The shaft 4 is connected by gearing 14 and a shaft 15 and a gearing 16 with the shaft 13, with a transmission gearing in the shaft 15, whereby the transmission of power to the shaft 4 can be controlled at will. The said clutch, and transmission gearing, of course, can be controlled by the foot-pedal 17 and lever 18 at the front of the machine. In this way, the motive power can be employed to propel the automobile-truck from one place to another, without operating the shaft 4, and, therefore, without operating the apparatus by which the materials are discharged from the hopper onto the ground.

At the rear of the hopper, an elevator or upright conveyer K is suitably mounted to discharge the materials into the hopper. Said elevator or conveyer preferably comprises an endless link-belt $k$ having buckets 19 thereon, and the lower end of the elevator is provided with a pan or sort of hopper 20, whereby the lower end of the conveyer or elevator can be pushed into a pile or bank of materials, by backing the automobile-truck, in a manner that will be readily understood. Also, with this arrangement, materials can be shoveled into the lower end of this elevator, thus making it convenient to load the machine. The lower shaft 21 of said elevator or conveyer is connected by bevel-gearing 22 with the longitudinal shaft 23 which leads to the gearing 24, so that this shaft is connected with the shaft 15, and whereby the belt $k$ is driven by the engine at the front of the automobile-truck. A clutch 25 is provided on the shaft 23, to control the transmission of power thereto, so that the operation of the elevator K can be controlled at will. The clutch 25 can be connected in any suitable manner with the hand-lever 26 in front of the driver's seat. It will be understood, however, that the power-transmitting connections, transmissions, clutches, etc., can be of any suitable, known or approved character, and that the arrangement shown and described is merely illustrative and suggestive, for it is obvious that for the broader purposes of the invention power-transmitting connections, transmissions and clutches of any suitable character can be employed. It is preferable as explained, that the arrangement be such that the automobile-truck can be caused to travel forward without the operation of the spreader-attachment, and without operating the elevator K, and that the arrangement be such that the elevator K, or the spreader apparatus can be operated while the truck is standing still and while the belts G and I are not in operation. While the arrangement shown and described involves the use of the usual automobile-engine for operating the spreader-attachment, and also the elevator or loading-attachment, it is obvious that separate or independent sources of motive power can be employed for these different purposes.

With the automobile-truck or distributing vehicle constructed as shown and described, a load of crushed rock, gravel or sand, or other materials, can be carried to the point or place where they are required for use, such as the building of a road, and then discharged onto the ground in the form of a sheet having the desired width and thickness, thus obviating the necessity of spreading the materials on the ground by hand. In fact, the invention obviates the necessity of spreading the materials after they reach the ground, for when discharged the materials are left on the ground exactly in the condition necessary for the desired purpose, such as successive layers of crushed rock, gravel or sand, or other materials ordinarily used in the building of roads. Ordinarily, in the building of roads, several dump-wagons and a number of laborers with wheelbarrows are necessary for the spreading of the crushed rock or other materials on the road. With an automobile-truck or distributor of the character shown and described, this labor and spreading of the materials by hand are entirely dispensed with. Obviously, therefore, the distributing truck shown and described will effect a reduction in the cost of constructing roads.

It will be seen that the belt G is necessarily narrower than the wheel-base, being disposed between the sides of the frame A, so that the sheet of materials formed thereon is of less width than said wheel-base. However, after the materials are again spread and flattened on the belt I, the sheet then has a greater width, and as the belt I is wider than the wheel-base, it follows that the sheet of materials when finally discharged onto the ground is wider than the wheel-base, whereby the rear wheels travel over the marginal portions of the sheet of crushed rock or sand or gravel, or other materials, thus gradually fed to the surface of the ground. This, it will be seen, is of importance when the machine is working on a road on which asphalt or other similar preparations are employed, as in such case the crushed rock or other materials are fed onto the asphalt in front of the rear wheels, so that the latter (these are the driving wheels) will roll over the crushed rock or other materials and thereby have increased traction on the ground. With the construction shown and described, the materials fall from the front end of the belt I along a transverse line which extends outside of the wheels C, ahead of said wheels, and by propelling the machine forward at the same time, at the proper speed, the sheet of materials formed on said belt is gradually delivered to the ground at the same thickness. However, by decreasing the speed of travel of the machine, the thickness of the sheet of materials on the ground can be increased, and by increasing the speed the thickness can be reduced, in a manner that will be readily understood. But, in any event, the sheet will be of uniform thickness, obviously, because of the spreading action before it reaches the ground.

It will be understood, of course, that the transmission-gearing L in the main driveshaft 13 is of the usual or any suitable form, such as that ordinarily found on an automobile, and is for the purpose of opening and closing the transmission and of varying the speed of the truck. Also, the transmission-gearing M is of a similar character, being adapted to open and close the transmission of power to the spreading apparatus, and to vary the speed thereof, whereby the speed of operation of the spreading apparatus can be regulated in accordance with the speed of the vehicle. In addition, it will be seen that the clutch N is located as usual, in rear of the engine O, so that this clutch (previously described in connection with the shaft 13) can be opened and closed to control the transmission of power from the engine to all of the different instrumentalities operated thereby.

While the invention as shown and described is in the form of an automobile-dumping-truck, it is obvious that the vehicle can be propelled in any suitable or desired manner, by horses or otherwise, but it is preferable, in any event, to employ power such as the engine shown and described, to operate the distributing apparatus and the elevator at the rear of the machine.

With the foregoing construction, it will be seen that the feeding of the materials in a flat sheet is of a positive character, and is accomplished without agitation of the materials, and in a way that makes it possible to produce a sheet of materials of the desired thickness which can then be discharged onto the surface of the ground in the desired manner, without increasing or decreasing the thickness thereof, so that the layer of materials on the ground will be substantially of the same thickness as that previously formed in the machine. Of course, the power plant has a separate power-transmitting connection for the propulsion of the truck, and a separate power-transmitting connection for the operation of the feeding and spreading means, and the speed of travel can be regulated to cause the materials to be discharged onto the surface of the ground in the desired manner, either thicker or thinner than the sheet of materials formed in the machine, as the operation of the feeding and spreading means is not dependent upon the forward motion of the truck.

What I claim as my invention is:—

1. In a distributing truck adapted for spreading loose paving materials in a sheet or layer on the ground, the combination of a hopper for the materials, instrumentalities disposed below the plane of the hopper and having means to spread the loose materials in a horizontally disposed flat sheet, and operative to carry and gradually feed said sheet by continuous motion thereof to the surface of the ground, while the truck is traveling along the street, including at least one forwardly traveling belt for supporting said sheet of materials, so that the sheet travels forward faster than the truck, and means to operate said belt.

2. The said structure, as specified in claim 1, comprising a second traveling belt arranged to receive the materials from said first belt and whereon the materials are again spread to form a sheet which is wider than said wheel-base, so that the final discharge of the materials onto the ground is along a transverse line a distance ahead of said rear wheels.

3. The said structure, as specified in claim 1, in which said means include a rotary spiral device disposed transversely above said belt to spread the materials thereon, and in which said belt travels forward in the direction of travel of the truck to carry the materials and said device.

4. The said structure, as specified in claim 1, in which said instrumentalities are disposed in position to discharge the materials ahead of the rear wheels of the truck and along a transverse line extending outside of the wheel-base so that said wheel will travel over the materials.

5. The said structure, as specified in claim 1, in which said belt is arranged between the rear wheels of the truck, and a second belt disposed ahead of the first belt, to receive the materials therefrom, the second belt being of greater width than the wheel-base, and said means including a spreader disposed over each belt, whereby the materials are subject to successive spreading operations before the sheet is gradually fed from the second belt onto the ground.

6. The said structure, as specified in claim 1, in which said hopper is provided with a discharge slot extending transversely of the truck, and in which said belt is disposed below said slot to receive the materials therefrom, with a valve to control the discharge from said slot onto the belt.

7. In a distributing truck, means to carry the materials for distribution on the ground, means including a plurality of traveling belts so arranged that the materials are subject to successive spreading operations before the final discharge thereof, and means to support said belts in position to receive the materials and deliver the last sheet onto the ground.

8. In a distributing truck for spreading materials on the ground, the combination of a hopper for the materials, and instrumentalities disposed below the hopper to receive the materials therefrom and having means to spread the materials in a horizontal flat sheet of the desired width and thickness and to thereafter gradually feed said sheet of materials to the surface of the ground, said instrumentalities including a traveling belt to receive the materials from the hopper, upon which the materials are spread to form a flat sheet of less width than the wheel-base of the truck, and a second traveling belt arranged to receive the materials from said first belt and whereon the materials are again spread to form a sheet which is wider than said wheel-base, so that the final discharge of the materials onto the ground is along a transverse line a distance ahead of said rear wheels.

9. In a distributing truck for spreading materials on the ground, the combination of a hopper for the materials, and instrumentalities disposed below the hopper to receive the materials therefrom and having means to spread the materials in a horizontal flat sheet of the desired width and thickness and to thereafter gradually feed said sheet of materials to the surface of the ground, said instrumentalities including a traveling belt arranged between the rear wheels of the truck and a second belt disposed ahead of the first belt, to receive the materials therefrom, the second belt being of greater width than the wheel-base, and said means including a spreader disposed over each belt, whereby the materials are subject to successive spreading operations before the sheet is gradually fed from the second belt onto the ground.

10. In a distributing truck for spreading materials on the ground, the combination of a traveling feed belt, means to deliver the materials to the upper surface of said belt, means to spread the materials in a flat sheet on said belt, and means to operate said belt to discharge the sheet of materials onto the surface of the ground while the truck is traveling forward.

11. A machine for carrying a quantity of loose materials, and for continuously forming the materials into a flat sheet prior to the discharge thereof onto the ground, comprising a horizontally disposed movable support, means adapted to form loose materials into a flat sheet on said support, means to operate said support relatively to the machine to carry the sheet along in the plane thereof, and means whereby the entire machine travels forward for the purpose of laying the sheet on the ground.

12. A structure as specified in claim 11, said movable support having motion to carry the sheet in the direction of travel of said machine, whereby the sheet travels faster than the machine, and so that said machine passes over the materials thus deposited on the ground.

13. A structure as specified in claim 11, said movable support comprising a horizontal belt conveyer disposed close to the ground to minimize scattering and bouncing of the materials as they fall on the ground surface.

14. A structure as specified in claim 11, said machine comprising means including a traveling belt for feeding the materials spread out thereon to said movable support.

15. A structure as specified in claim 11, said machine comprising a traveling belt to receive said sheet from said movable support and finally discharge the same onto the ground.

Signed by me at Chicago, Illinois, this 28th day of April, 1917.

NELSON W. NAPIER.